United States Patent
Yonezawa et al.

(10) Patent No.: US 8,773,103 B2
(45) Date of Patent: Jul. 8, 2014

(54) POWER SUPPLY DEVICE

(75) Inventors: Yu Yonezawa, Kawasaki (JP); Yoshiyasu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/491,047

(22) Filed: Jun. 7, 2012

(65) Prior Publication Data

US 2012/0242302 A1 Sep. 27, 2012

Related U.S. Application Data

(63) Continuation of application No. PCT/JP2009/006868, filed on Dec. 15, 2009.

(51) Int. Cl.
*H02M 3/156* (2006.01)

(52) U.S. Cl.
USPC .............. 323/299; 323/266; 323/267; 307/31

(58) Field of Classification Search
CPC .............. H02M 3/156; H02M 3/1563; H02M 2001/0022; H02M 2001/0016
USPC ............ 323/266, 282, 285, 299, 267; 307/31, 307/33, 38, 42
See application file for complete search history.

(56) References Cited

U.S. PATENT DOCUMENTS

| | | | | |
|---|---|---|---|---|
| 5,134,355 A | * | 7/1992 | Hastings | 323/211 |
| 5,847,549 A | * | 12/1998 | Dodson, III | 323/220 |
| 6,118,676 A | * | 9/2000 | Divan et al. | 363/34 |
| 6,900,624 B2 | * | 5/2005 | Abo | 323/284 |
| 7,446,430 B2 | * | 11/2008 | Leung et al. | 307/38 |
| 7,884,586 B2 | * | 2/2011 | Fabbro | 323/259 |
| 2004/0100241 A1 | | 5/2004 | Abo | |
| 2005/0058220 A1 | * | 3/2005 | Nagatani et al. | 375/296 |

(Continued)

FOREIGN PATENT DOCUMENTS

| | | |
|---|---|---|
| JP | 2002-315313 | 10/2002 |
| JP | 2004-147371 | 5/2004 |

(Continued)

OTHER PUBLICATIONS

English Translation of the Written Opinion of the International Searching Authority mailed Jan. 26, 2010 issued in corresponding International Patent Application No. PCT/JP2009/006868.

(Continued)

*Primary Examiner* — Gary L Laxton
*Assistant Examiner* — Kyle J Moody
(74) *Attorney, Agent, or Firm* — Staas & Halsey LLP

(57) ABSTRACT

A power supply device includes a step-down unit to step down an input voltage, a switching unit to perform switching on a stepped-down voltage obtained through the stepping down by the step-down unit so as to externally output the voltage, an output variation detection unit to detect a corresponding variation of output from the switching unit, a delay unit to delay the input voltage by a prescribed time period, a delay variation detection unit to detect a corresponding variation of a delayed voltage output from the delay unit, an addition unit to add corresponding variations of the power supply voltage and the delayed voltage respectively detected by the output variation detection unit and the delay variation detection unit, and a control unit to perform feedback control on the basis of the corresponding variations of the power supply voltage and the delayed voltage added by the addition unit.

7 Claims, 14 Drawing Sheets

(56) References Cited

U.S. PATENT DOCUMENTS

| | | | |
|---|---|---|---|
| 2006/0131961 A1* | 6/2006 | Ishii et al. | 307/31 |
| 2008/0246453 A1* | 10/2008 | Cagno et al. | 323/282 |
| 2009/0102441 A1* | 4/2009 | de Cremoux et al. | 323/271 |
| 2009/0179487 A1* | 7/2009 | Liu | 307/31 |
| 2011/0080755 A1* | 4/2011 | Huang et al. | 363/13 |

FOREIGN PATENT DOCUMENTS

| | | |
|---|---|---|
| JP | 2005-110374 | 4/2005 |
| JP | 2006-149107 | 6/2006 |
| JP | 2007-506258 | 3/2007 |
| WO | 02/082615 A1 | 10/2002 |
| WO | 03/103164 A1 | 12/2003 |
| WO | 2005/031790 A1 | 4/2005 |

OTHER PUBLICATIONS

International Preliminary Report on Patentability mailed Jun. 28, 2012 (English Translation mailed Jul. 19, 2012) issued in corresponding International Patent Application No. PCT/JP2009/006868.
International Search Report for PCT/JP2009/006868 mailed Jan. 26, 2010.

* cited by examiner

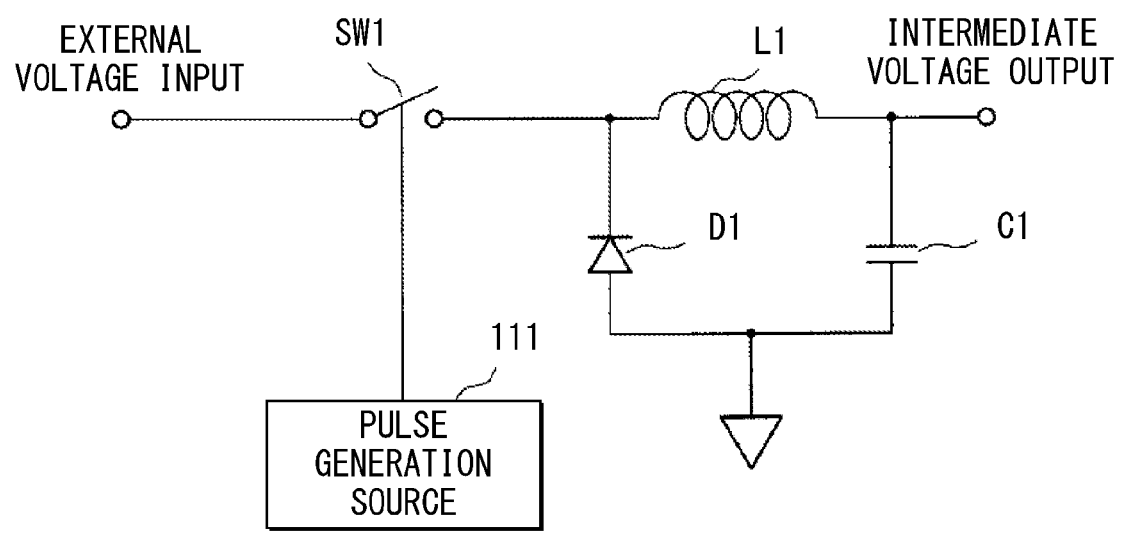
F I G. 2

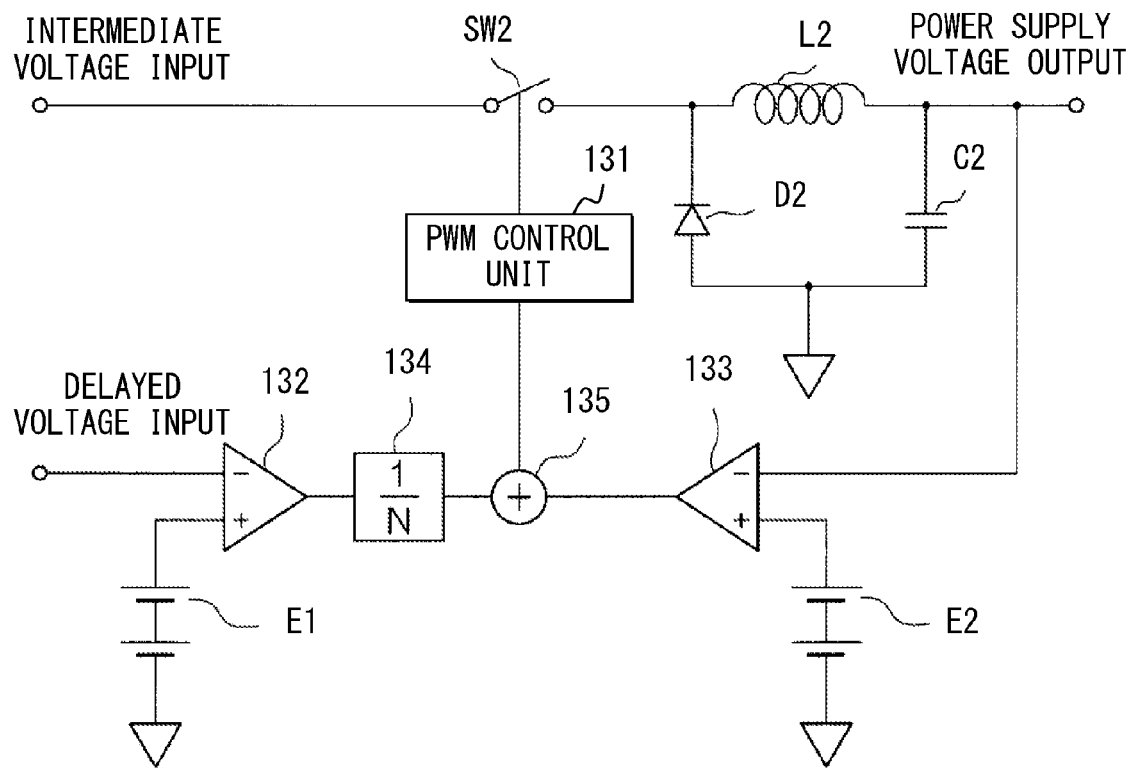
F I G. 3

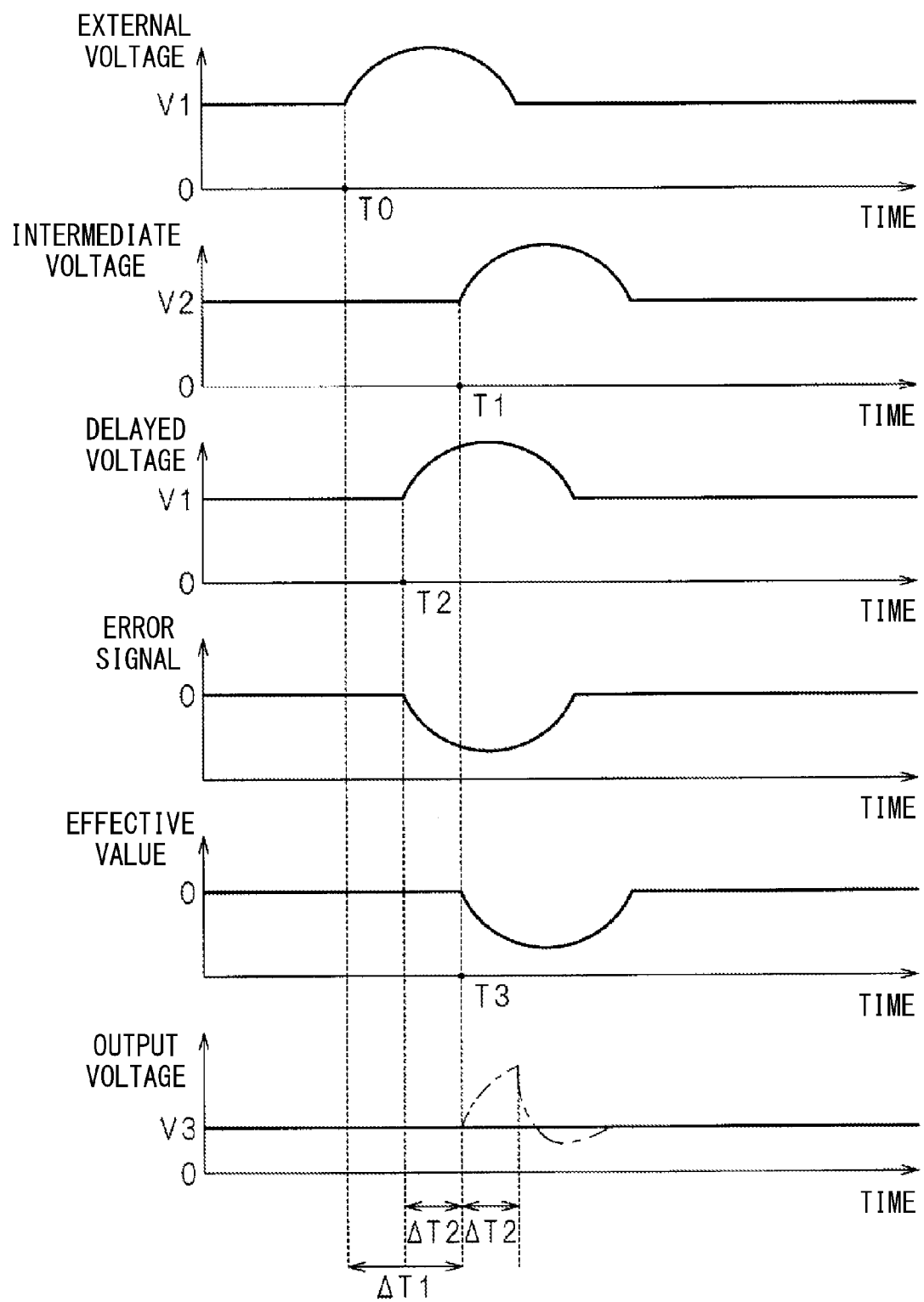
F I G. 4

POWER SUPPLY DEVICE

CROSS-REFERENCE TO RELATED APPLICATION

This application is a continuation of PCT application PCT/JP2009/006868, filed on Dec. 15, 2009, the entire contents of which are incorporated herein by reference.

FIELD

The embodiments discussed herein are related to a power supply device that suppresses variations in a power supply voltage.

BACKGROUND

In recent years, electronic devices have been using components such as CPUs (Central Processing Units), memory, micro controllers, and the like that require various power supply voltages, and accordingly such electronic devices include a power supply device that outputs a plurality of power supply voltages. When a centralized-type power supply device, in which an external voltage is converted by a single stabilized-power supply into a plurality of power supply voltages to be output to components, is used, wiring resistance between the stabilized-power supply and the components causes a voltage drop, decreasing the power supply efficiency. Also, when load currents flowing through components vary, the amount of voltage drop caused by wiring resistance varies, thus varying the power supply voltages output to the components.

In order to cope with this, a method is known in which a stabilized-power supply is used to step down an external voltage into an intermediate voltage, and a plurality of distributed power supplies to convert an intermediate voltage into a power supply voltage are each disposed in immediate proximity to a component in order to reduce the voltage drop caused by wiring resistance. This distributed power supply is called a POL (Point of Load) power supply. Also, a non-stabilized power supply that yields a high supply efficiency is sometimes used instead of a stabilized-power supply so as to step down an external voltage to an intermediate voltage and to convert the intermediate voltage into a plurality of power supply voltages by using a plurality of POL power supplies. When an intermediate voltage output from the non-stabilized power supply varies, each of the plurality of POL power supplies performs stabilizing operations.

A switching power supply capable of outputting a low voltage and a high current is sometimes used for a POL power supply. A switching power supply performs switching on an external voltage in accordance with a pulse signal so as to output a power supply voltage, and also performs feedback control on the duty ratio of the pulse signal so that the power supply voltage to be output becomes consistent. Thereby, the switching power supply suppresses variations in a power supply voltage so as to stabilize the power supply voltage (See Patent Documents 1 through 3 for example).

Patent Document 1: Japanese Laid-open Patent Publication No. 2002-315313
Patent Document 2: Japanese Laid-open Patent Publication No. 2004-147371
Patent Document 3: Japanese Laid-open Patent Publication No. 2005-110374

In spite of the fact described above, the feedback control of a power supply device using a conventional POL power supply is not capable of following variations in an external voltage that are quicker than the feedback delay time, thus allowing the power supply voltage to vary, which has been problematic.

SUMMARY

A power supply device according to an aspect of embodiments described below is a power supply device having a step-down unit to step down an input voltage, a switching unit to perform switching on a stepped-down voltage obtained through the stepping down by the step-down unit so as to externally output the voltage, an output variation detection unit to detect a corresponding variation of output from the switching unit, and a control unit to perform feedback control on an operation of the switching unit on the basis of the corresponding variation detected by the output variation detection unit, wherein the power device includes a delay unit to delay the input voltage by a prescribed time period, a delay variation detection unit to detect a corresponding variation of a delayed voltage output from the delay unit, and an addition unit to add corresponding variations of the power supply voltage and the delayed voltage respectively detected by the output variation detection unit and the delay variation detection unit, and wherein the control unit performs feedback control on the basis of the corresponding variations of the power supply voltage and the delayed voltage added by the addition unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a circuit diagram illustrating an example of an internal circuit of a non-stabilized power supply unit;

FIG. 3 is a circuit diagram illustrating an example of an internal circuit used for a POL power supply unit;

FIG. 4 is a timing chart to explain timings for voltages and signals according to embodiment 1;

DESCRIPTION OF EMBODIMENTS

Embodiment 1

Figure 1:
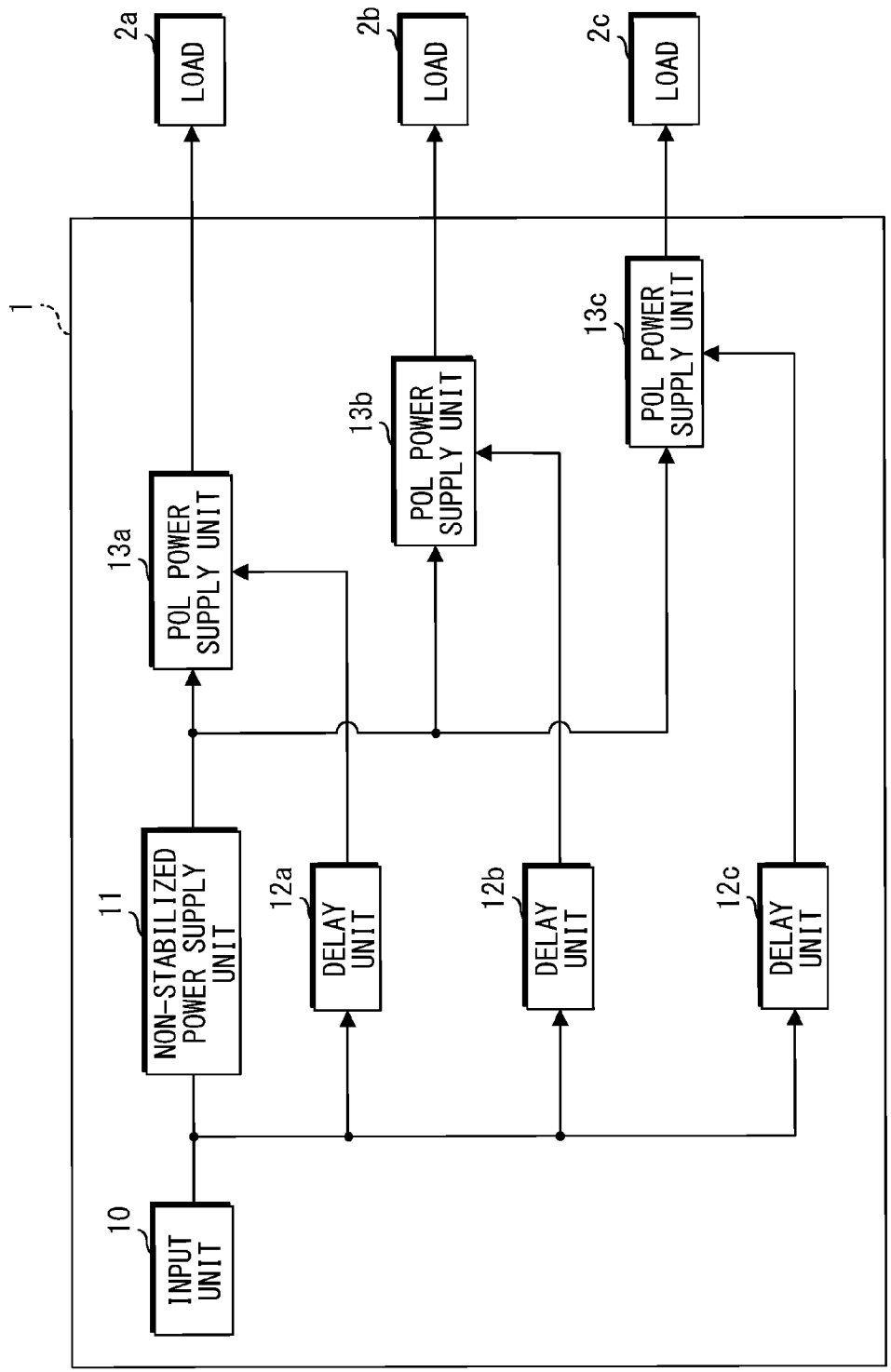
FIG. 1 is a block diagram illustrating a power supply device according to embodiment 1 and depicting loads serving as output destinations of power supply voltages.

Hereinafter, specific explanations will be given on the embodiments by referring to the drawings. A power supply device according to the present application is included in an electronic device such as a server, a personal computer (PC), or the like, and converts an alternating-current supply or a direct-current supply input from an external commercial-power source or the like into a plurality of power supply voltages that correspond to units of hardware. Then, the power supply device outputs the power supply voltages to a plurality of loads that correspond to the units of the hardware. The power supply device includes a step-down unit to step down the externally-input voltage into a prescribed voltage, and POL power supply devices disposed close to the loads so as to convert the prescribed voltage into power supply voltages corresponding to the loads and so as to output them. The present embodiment will be explained by describing an example of a power supply device that receives a direct-current voltage input externally, that converts that voltage into three different power supply voltages, and that outputs them to three loads.

FIG. 1 is a block diagram illustrating a power supply device 1 according to embodiment 1 and depicting loads 2a, 2b, and 2c serving as output destinations of power supply voltages. The power supply device 1 outputs power supply voltages that correspond to the loads 2a, 2b, and 2c. The power supply device includes an input unit 10 connected to an external commercial-power source or the like so as to receive an external direct-current voltage (an input voltage), and a non-stabilized power supply unit (step-down unit) 11 to output an intermediate voltage (stepped-down voltage) obtained by stepping down an external voltage at prescribed step-down ratio N (stepped-down voltage). Also, the power supply device 1 includes POL power supply units (switching units) 13a, 13b, and 13c that convert intermediate voltages into power supply voltages corresponding to the loads 2a, 2b, and 2c, respectively, so as to output the resultant voltages to the external environment.

When an external voltage is, for example, 48V, the intermediate voltage is set to, for example, 12V, which is lower than the external voltage. Also, power supply voltages are set to be prescribed values within a range of, for example, 1V through 3V so that these voltages correspond to the output-destination loads 2a, 2b, and 2c. Further, the power supply device 1 includes delay units 12a, 12b, and 12c to give, to POL power supply units 13a, 13b, and 13c, delayed voltages obtained by delaying the waveforms of externally-input direct-current voltages by a prescribed time period. In the non-stabilized power supply unit 11, an intermediate voltage to be output is delayed by a delay time (step-down delay time) ΔT1 with respect to an input external voltage because stepping down of an external voltage takes time.

The POL power supply units 13a, 13b, and 13c perform feedback control on the basis of a given intermediate voltage, a delayed voltage, and a power supply voltage that is being output so that the power supply voltage becomes a prescribed value. Also, each of the POL power supply units 13a, 13b, and 13c holds a feedback delay time ΔT2. The delay units 12a, 12b, and 12c include delay circuits such as, for example, an RC parallel circuit, an RL parallel circuit, a digital filter circuit, or the like. The difference between the delay time ΔT1 and the feedback delay time ΔT2 represented by the equation below is set as a delay setting time ΔT in the delay units 12a, 12b, and 12c.

$$\Delta T = \Delta T1 - \Delta T2 \quad (1)$$

The delay setting time ΔT may be calculated from the delay time ΔT1 of the non-stabilized power supply unit 11 obtained experimentally or empirically, the feedback delay time ΔT2 of each of the POL power supply units 13a, 13b and 13c, and equation (1) in order to be set in each of the delay units 12a, 12b, and 12c. The external-voltage input of the non-stabilized power supply unit 11 and the external-voltage inputs of the delay units 12a, 12b, and 12c are connected to the output terminal of the input unit 10. The intermediate-voltage output of the non-stabilized power supply unit 11 is connected to the intermediate-voltage inputs of the POL power supply units 13a, 13b, and 13c.

Delayed voltage outputs of the delay units 12a, 12b, and 12c are respectively connected to the delayed-voltage inputs of the POL power supply units 13a, 12b, and 13c. The power-supply-voltage outputs of the POL power supply units 13a, 13b, and 13c are respectively connected to the loads 2a, 2b, and 2c, which are the output destinations of the power supply voltages. The POL power supply units 13a, 13b, and 13c respectively refer to the delayed voltages given from the delay units 12a, 12b, and 12c, perform feedback control so that the intermediate voltages given from the non-stabilized power supply unit 11 correspond to the loads 2a, 2b, and 2c, respectively, and output the resultant voltages.

FIG. 2 is a circuit diagram illustrating an example of an internal circuit of the non-stabilized power supply unit 11. The non-stabilized power supply unit 11 includes a switching element SW1 to perform switching on an external voltage input through an external voltage input so as to step it down, and a pulse generation source 111 to give a pulse signal to the switching element SW1. The pulse generation source 111 corresponds to a step-down ratio N that is preset in the non-stabilized power supply unit 11, and generates a pulse signal having a fixed duty ratio and frequency so as to give the signal to the switching element SW1.

The switching element SW1 performs switching in response to a pulse signal given from the pulse generation source 111. The output terminal of the switching element SW1 is connected to the intermediate-voltage output via inductor L1. Both terminals of the inductor L1 are grounded via a diode D1 and a capacitor C1. The inductor L1, the diode D1, and the capacitor C1 function as a filter circuit to convert, into a continuous voltage having the effective value of the intermittent voltage as the output value, the intermittent voltage obtained by switching an intermediate voltage by using the switching element SW1. The non-stabilized power supply unit 11 outputs, from the intermediate-voltage output, the intermediate voltage obtained by switching and stepping down the external voltage.

FIG. 3 is a circuit diagram illustrating an example of an internal circuit used for the POL power supply units 13a, 13b, and 13c. The POL power supply units 13a, 13b, and 13c are switching power supplies, and each of them includes: a switching element SW2 to perform switching on an intermediate voltage given to the intermediate-voltage input so as to step down the voltage; and a PWM control unit 131 to perform PWM control on switching operations of the switching element SW2. The output terminal of the switching element SW2 is connected to the power-supply-voltage output via an inductor L2. Both terminals of the inductor L2 are grounded via a diode D2 and a capacitor C2.

The inductor L2, the diode D2, and the capacitor C2 function as a filter circuit to convert, into a continuous voltage having the effective value of the intermittent voltage as the output value, the intermittent voltage obtained by switching an intermediate voltage by using the switching element SW2. One of the input terminals of a comparator (output variation detection unit) 133 is connected to the power-supply-voltage output, and the comparator 133 outputs a difference between a reference power supply voltage output from a reference-voltage supply E2 and a power supply voltage given from the power-supply-voltage output. The reference power supply voltages output from the reference-voltage supply E2 are preset so that they represent the voltage values of the power supply voltages that correspond to loads 2a, 2b, and 2c.

The output terminal of the comparator 133 is connected to one of the input terminals of an adder 135. One of the input terminals of a comparator (delay variation detection unit) 132 is connected to the delayed-voltage input, and the comparator 132 outputs a difference between a reference intermediate voltage output from a reference-voltage supply E1 and a delayed voltage given from a delayed voltage input. The reference intermediate voltages output from the reference-voltage supply E1 are preset so that they represent the voltage values when intermediate voltages output from the non-stabilized power supply unit 11 do not vary. A divider 134 to perform division at step-down ratio N that is preset in the non-stabilized power supply unit 11 is connected to the output terminal of the comparator 132, and the output terminal of the divider 134 is connected to the other input terminal of the adder (addition unit) 135.

The output terminal of the adder 135 is connected to the feedback input of the PWM control unit 131. Thereby, a voltage obtained by dividing the difference voltage output from the comparator 132 by step-down ratio N and the difference voltage output from the comparator 133 are added to each other, and the resultant voltage is given to the PWM control unit 131 as an error signal. The PWM control unit 131 performs PWM control on the duty ratio of a pulse signal to be given to the switching element SW2 so that the given error signal becomes zero. Next, explanations will be given for operations of the power supply device 1 performed when an external voltage varies.

FIG. 4 is a timing chart explaining timings for voltages and signals according to embodiment 1. In FIG. 4, an external voltage, an intermediate voltage, a delayed voltage, an error signal, the effective value of a PWM signal, and an output voltage are arranged from top to bottom on synchronized time axes. The output voltage is a power supply voltage output respectively from the POL power supply units 13a, 13b, and 13c to the loads 2a, 2b, and 2c. In the example illustrated in FIG. 4, output voltages have not been varied by the variation in the load currents flowing through the loads 2a, 2b, and 2c, and this example corresponds to a case where an external voltage input to the power supply device 1 has varied. The effective value of the PWM signal illustrated in FIG. 4 is the effective value of the PWM signal that the PWM control unit 131 gives to the switching element SW2, and corresponds to the amount of control performed on the power supply voltage to be output.

As illustrated in FIG. 4, when the external voltage varies from V1 at time point T0, then, in the intermediate voltage representing the reference intermediate voltage V2 output from the non-stabilized power supply unit 11, a corresponding variation appears at time point T1, which is later than the time point T0 by the delay time ΔT1 that the non-stabilized power supply unit 11 needs to step down the voltage. A corresponding variation appears in the delayed voltage at time point T2, which is later than the time point T0 by a time period corresponding to a difference between the delay time ΔT1 and the feedback delay time ΔT2. Also, a variation corresponding to a difference between a delayed voltage obtained through division by step-down ratio N and the reference intermediate voltage V2 appears in the error signal input to the PWM control unit 131.

The PWM control unit 131 performs PWM control on switching operations of the switching element SW2 so that the corresponding variation included in the error signal becomes zero. A PWM signal that has been modified to cancel the corresponding variation included in the intermediate voltage is output from the PWM control unit 131 to the switching element SW2 at time point T3, which is later than the time point T2 (i.e., the time when the corresponding variation appeared in the error signal) by the feedback delay time ΔT2. In the example illustrated in FIG. 4, the control amount corresponding to the corresponding variation included in the intermediate voltage appears in the effective value of the PWM signal at time point T3. At time point T3, no delay is caused with respect to the corresponding variation included in the intermediate voltage because T3 is almost the same as T1, and accordingly the PWM signal is modified so as to cancel the corresponding variation. Further, no corresponding variations appear in the output voltage, and the power supply voltage representing reference power supply voltage V3 is output from the power-supply-voltage output continuously.

Hereinbelow, explanations will be given for conventional operations in which an error signal based on a difference between a delayed voltage and a reference intermediate voltage is not input to the PWM control unit 131, and only an error signal based on a difference between an intermediate voltage and a reference intermediate voltage is input. In such a case, the signal is modified into a PWM signal corresponding to the corresponding variation at a time point which is later than the time point T1, i.e., the time when the corresponding variation appeared in the intermediate voltages input to the POL power supply units 13a, 13b, and 13c, by the feedback delay time ΔT2. Then, corresponding variations as depicted by the dashed lines in FIG. 4 appear in the output voltage. In the present embodiment, i.e., embodiment 1, even when the external voltage to be input to the power supply device 1 has varied, the corresponding variation does not appear in the output voltage, so that stable power supply voltages can be output to the loads 2a, 2b, and 2c.

Embodiment 2

Figure 5:
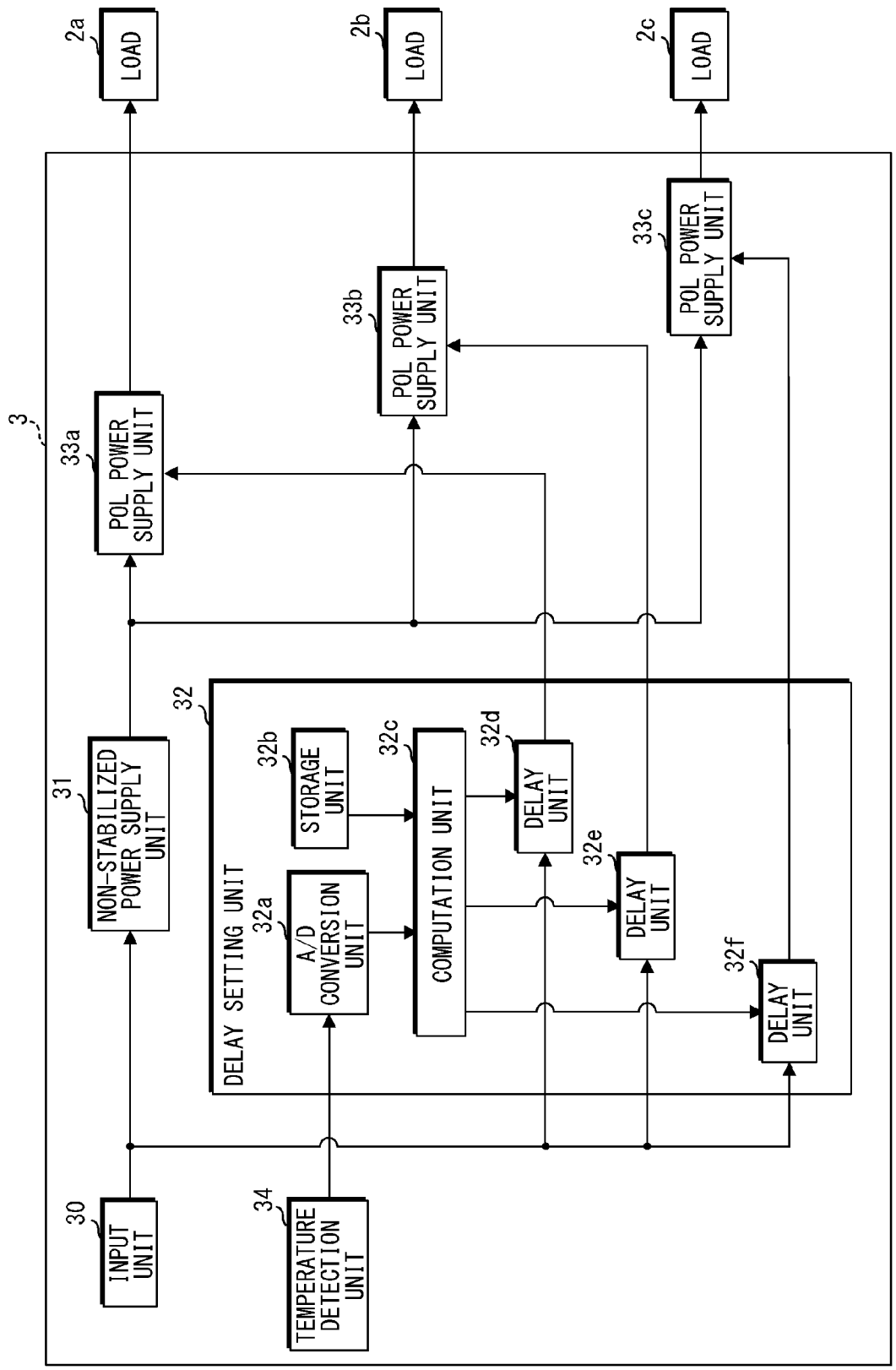
FIG. 5 is a block diagram illustrating a power supply device according to embodiment 2 and depicting loads as the output destinations of power supply voltages.

FIG. 5 is a block diagram illustrating a power supply device 3 according to embodiment 2 and depicting the loads 2a, 2b, and 2c as the output destinations of power supply voltages. While delay times are preset in the delay units 12a, 12b, and 12c in embodiment 1, delay times are set on the basis of detected temperatures in embodiment 2. The power supply device 3 includes a temperature detection unit 34 to detect the temperature in the power supply device 3, and a delay setting unit 32 to set delay times, and the power supply device 3 outputs different power supply voltages to the loads 2a, 2b, and 2c. Units in the form of hardware in the power supply device 3 are similar to those in embodiment 1 except for units in the form of hardware included in the delay setting unit 32, and accordingly only differences in their symbols (reference marks) are described, omitting detailed explanations.

The power supply device 3 includes an input unit 30, a non-stabilized power supply unit 31, and POL power supply units 33a, 33b, and 33c. The delay setting unit 32 includes: an A/D conversion unit 32a to perform A/D (Analog-Digital) conversion on an analog temperature detection signal input from the temperature detection unit 34 in order to convert the analog signal into temperature data in the form of a digital signal; and a storage unit 32b to store an approximate equation. An approximate equation to represent the temperature dependency of the delay time $\Delta T1$ of the non-stabilized power supply unit 31 and the feedback delay time $\Delta T2$ of each of the POL power supply units 33a, 33b, and 33c is obtained experimentally and is stored in the storage unit 32b.

Also, the delay setting unit 32 includes a computation unit (calculation unit) 32c to calculate the delay setting time $\Delta T$ to be set on the basis of temperature data and an approximate equation, and delay units 32d, 32e, and 32f to give delayed voltages to the POL power supply units 33a, 33b, and 33c, respectively. The delay setting time $\Delta T$ calculated by the computation unit 32c is set in each of the delay units 32d, 32e, and 32f, and the delayed voltage obtained by delaying an output voltage by the delay setting time $\Delta T$ is given to each of the POL power supply units 33a, 33b, and 33c.

Figure 6:
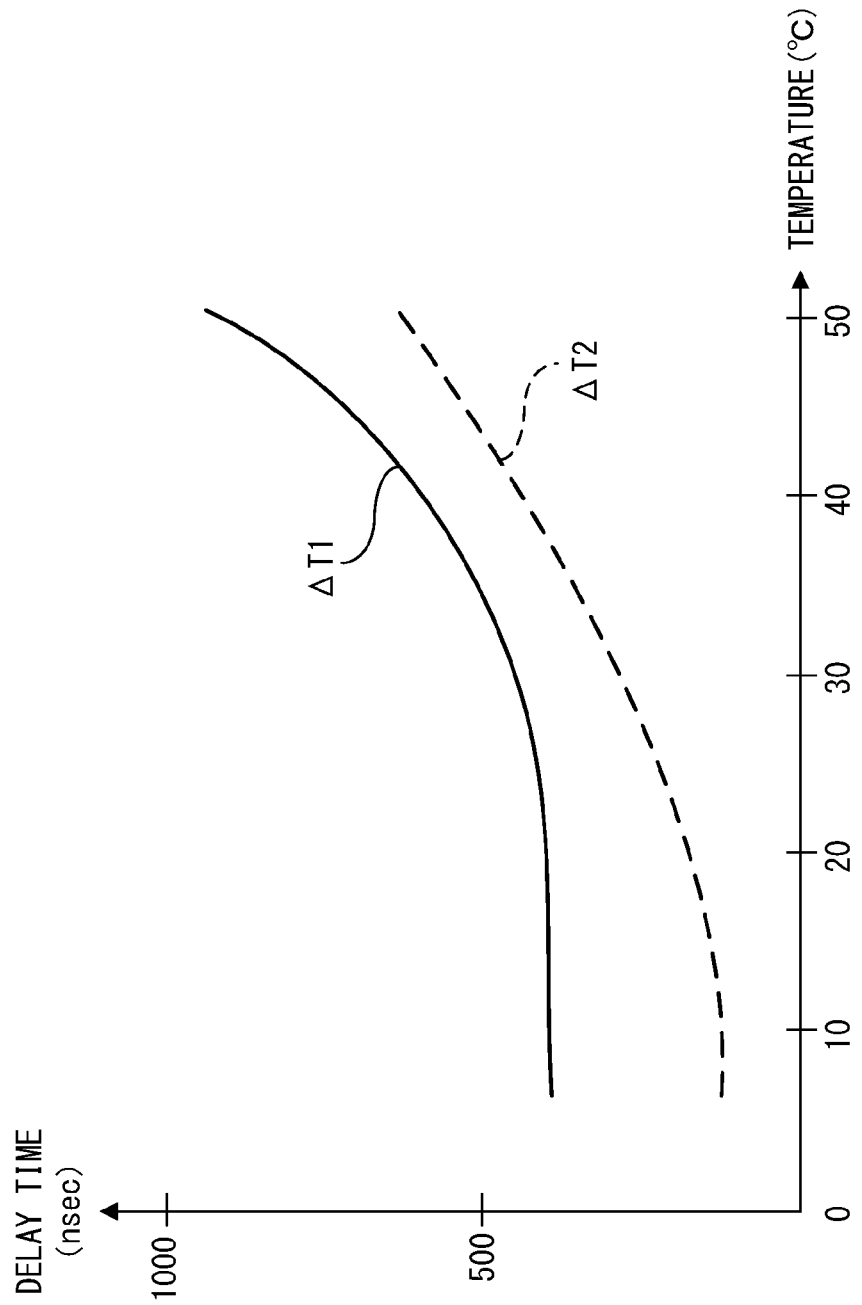
FIG. 6 depicts an example of temperature dependency of a delay time and a feedback delay time.

FIG. 6 depicts an example of the temperature dependency of the delay time $\Delta T1$ and the feedback delay time $\Delta T2$. The horizontal axis and the vertical axis in FIG. 6 represent temperature and delay time, respectively. The delay time $\Delta T1$ and the feedback delay time $\Delta T2$ within a temperature range corresponding to the use environment for the power supply device 3 are measured in advance. FIG. 6 depicts an example of the delay time $\Delta T1$ measured in a temperature range between 6° C. and 50° C. and represented by a solid line, and the feedback delay time $\Delta T2$ represented by a dashed line. Both the delay time $\Delta T1$ and the feedback delay time $\Delta T2$ become longer as the temperature rises. The approximate equation representing the temperature dependency of the measured delay time $\Delta T1$ and the feedback delay time $\Delta T2$ is obtained by using a least squares approximation or the like, and the obtained approximate equation is stored in the storage unit 32b.

Figure 7:
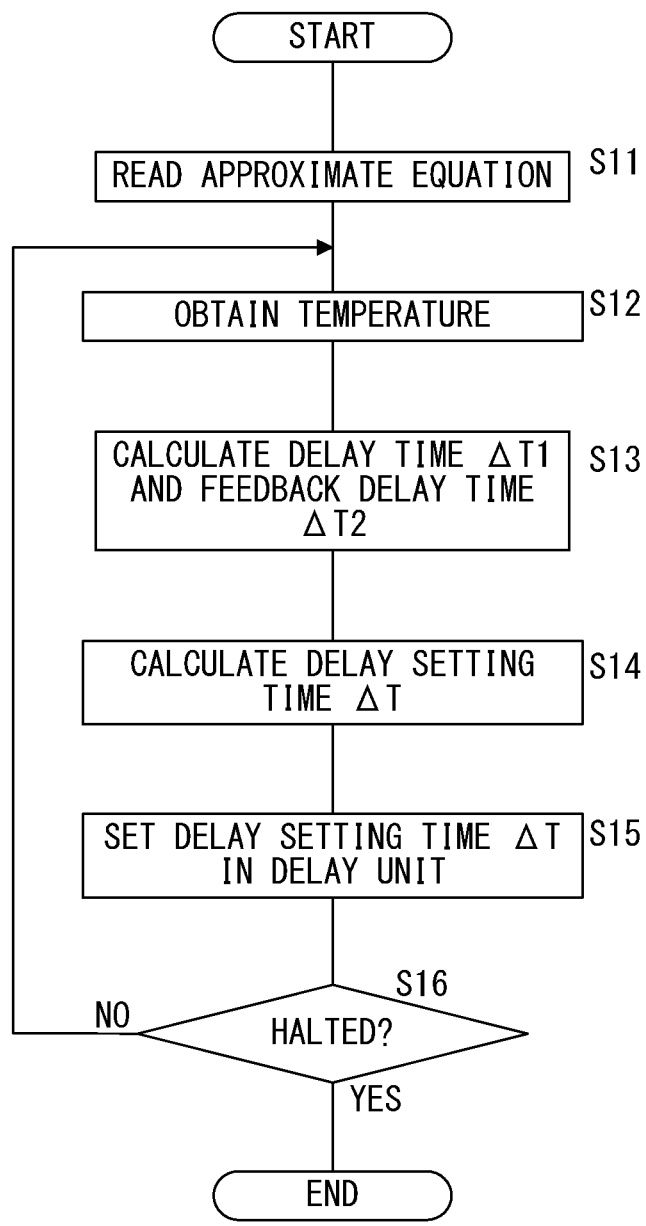
FIG. 7 is a flowchart representing steps of a setting process according to embodiment 2.

FIG. 7 is a flowchart representing steps of a setting process according to embodiment 2. The setting process is started by the computation unit 32c when the power supply device 3 is activated. The computation unit 32c reads and loads the approximate equation stored in the storage unit 32b into embedded RAM (Random Access Memory), which is not illustrated (step S11). The computation unit 32c obtains temperature from the A/D conversion unit 32a on the basis of temperature data input from the A/D conversion unit 32a (step S12). The computation unit 32c calculates the delay time $\Delta T1$ corresponding to the temperature and the feedback delay time $\Delta T2$ of each of the POL power supply units 33a, 33b, and 33c on the basis of the approximate equation (step S13).

The computation unit 32c calculates a difference between the delay time $\Delta T1$ and the feedback delay time $\Delta T2$ of each of the POL power supply units 33a, 33b, and 33c so as to calculate the delay setting time $\Delta T$ for each of the delay units 32d, 32e, and 32f (step S14). The delay setting unit 32 sets the delay setting time $\Delta T$ in each of the delay units 32d, 32e, and 32f (step S15). The computation unit 32c determines whether or not the device has halted in response to operations of a halt switch provided in the power supply device 3 (step S16). When computation unit 32c determines that the device has not halted (NO in step S16), the process returns to step S12. When computation unit 32c determines that the device has halted (YES in step S16), the setting process is terminated.

A case in which an approximate equation representing the temperature dependency of the delay time $\Delta T1$ and the feedback delay time $\Delta T2$ is stored in the storage unit 32b has been described. However, the scope of the present invention is not limited to this case. For example, it is also possible to obtain beforehand an approximate equation representing the temperature dependency of the delay setting time so as to store it in the storage unit 32b. In such a case, in step S13 in the setting process illustrated in FIG. 7, the delay setting time $\Delta T$ corresponding to the temperature is calculated on the basis of the approximate equation, and the delay setting time $\Delta T$ is set in each of the delay units 32d, 32e, and 32f in step S15, skipping step S14.

A case in which the storage unit 32b stores an approximate equation has been explained. However, the scope of the present invention is not limited to this case. It is also possible to employ a configuration in which the delay setting unit 32 stores a table holding a plurality of temperatures, the delay time $\Delta T1$ associated with each temperature, and the feedback delay time $\Delta T2$ associated with each of the POL power supply units 33a, 33b, and 33c. In such a case, the computation unit 32c functions as a reading unit to read, from the table stored in the storage unit 32b, the delay time $\Delta T1$ and the feedback delay time $\Delta T2$ corresponding to an obtained temperature. When the delay time $\Delta T1$ and the feedback delay time $\Delta T2$ corresponding to a detected temperature are not stored in the table, they may be obtained by performing compensation on the basis of the delay time $\Delta T1$ and the feedback delay time $\Delta T2$ corresponding to a temperature close to a detected temperature.

A case in which the single temperature detection unit 34 is provided in the power supply device 3 has been described. However, the scope of the present invention is not limited to this example. It is also possible to provide the power supply device 3 with a plurality of temperature detection units 34 to detect the temperature of the non-stabilized power supply unit 11 and the temperature of each of the POL power supply units 33a, 33b, and 33c. In such a case, the delay time $\Delta T1$ corresponding to the temperature of a non-stabilized power supply unit 33 and the feedback delay time $\Delta T2$ corresponding to the temperature of each of the POL power supply units 33a, 33b, and 33c may be calculated on the basis of the approximate equation. Thereby, even when the temperatures are different between hardware units in the power supply device 3, the variation levels caused in the power supply voltages to be output can be suppressed.

According to the present embodiment, the delay setting time $\Delta T$ is altered on an as-needed basis in accordance with a detected temperature and an approximate equation stored beforehand, and accordingly it is possible to avoid a timing shift with respect to a variation in an external voltage by performing feedback control. Thereby, even when the delay time $\Delta T1$ and the feedback delay time $\Delta T2$ vary depending upon temperature, corresponding variations caused in power supply voltages to be output can be suppressed.

Embodiment 2 is as has been described, and other aspects are similar to those in embodiment 1, and accordingly corresponding portions are denoted by the same symbols so that explanations thereof will not be given.

Embodiment 3

Figure 8:
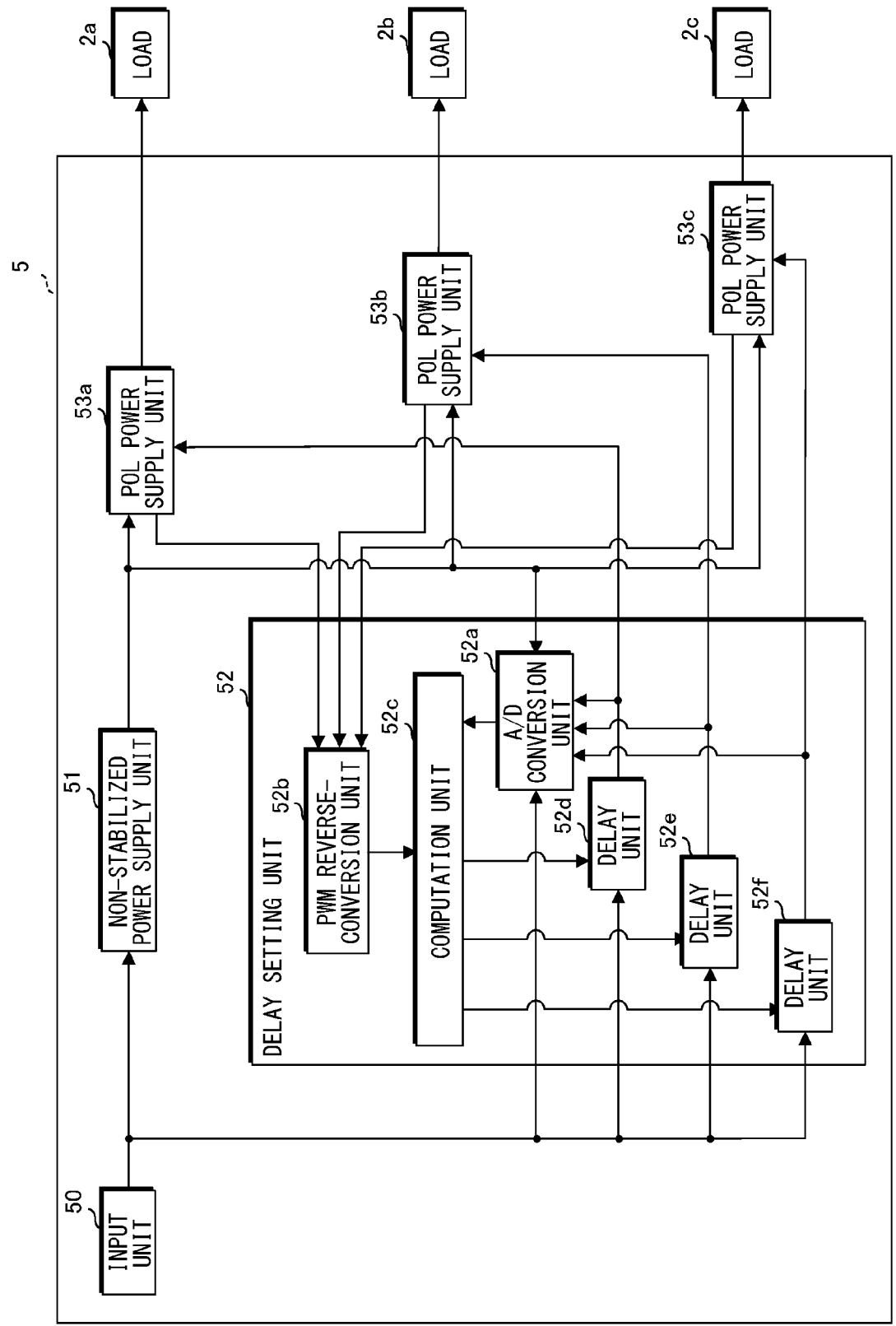
FIG. 8 is a block diagram illustrating a power supply device according to embodiment 3 and depicting loads as the output destinations of power supply voltages.

FIG. 8 is a block diagram illustrating a power supply device 5 according to embodiment 3 and depicting the loads 2a, 2b, and 2c as the output destinations of power supply voltages. While the delay setting time $\Delta T$ is set on the basis of a temperature measured on an as-needed basis and an approximate equation stored in advance in embodiment 2, a ripple voltage appearing in an external voltage is detected so as to set the delay setting time $\Delta T$ in embodiment 3. The power supply device 5 includes a delay setting unit 52 to set the delay setting time ΔT, and supplies different power supply voltages to the loads 2a, 2b, and 2c. Units in the form of hardware in the power supply device 5 are similar to those in embodiment 1 except for units in the form of hardware included in the delay setting unit 52, and accordingly only differences in symbols are described, omitting detailed explanations.

The power supply device 5 includes an input unit 50, a non-stabilized power supply unit 51, and POL power supply units 53a, 53b, and 53c. The delay setting unit 52 includes an A/D conversion unit 52a to perform A/D conversion on an external voltage, an intermediate voltage, and a delayed voltage in order to convert them into voltage data, a PWM reverse-conversion unit (conversion unit) 52b to reversely convert a PWM signal, and a computation unit 52c to calculate the delay setting time ΔT. An external voltage, an intermediate voltage, and a delayed voltage are given to the A/D conversion unit 52a from the external-voltage output of the input unit 50, the intermediate output of the non-stabilized power supply unit 51, and the delayed-voltage outputs of delay units 52d, 52e, and 52f, respectively.

PWM signals are given to the PWM reverse-conversion unit 52b from the respective PWM signal outputs of the POL power supply units 53a, 53b, and 53c. PWM-signal output may be connected to, for example, the PWM-signal output of the PWM control unit 131 illustrated in FIG. 3 so as to be provided to the POL power supply units 53a, 53b, and 53c. The PWM reverse-conversion unit 52b outputs to the computation unit 52c voltage data obtained by converting a PWM signal into a PWM reversely-converted signal (effective-value voltage) representing the effective value of the PWM signal and by further performing A/D conversion on the resultant signal. The computation unit 52c functions as a ripple voltage detection unit to detect a ripple voltage included in an external voltage (input voltage), a stepped-down voltage (intermediate voltage), a delayed voltage, and a PWM reverse signal (effective-value voltage).

The computation unit 52c functions also as a delay time measuring unit to measure the delay time (step-down delay time) ΔT1 and the feedback delay time ΔT2 on the basis of a detected ripple voltage. The delay setting unit 52 includes the delay units 52d, 52e, and 52f to give delayed voltages obtained by delaying an external voltage by the delay setting time ΔT to the POL power supply units 53a, 53b, and 53c, respectively. The delay setting time ΔT calculated by the computation unit 52c is set in each of the delay units 52d, 52e, and 52f.

Figure 9:
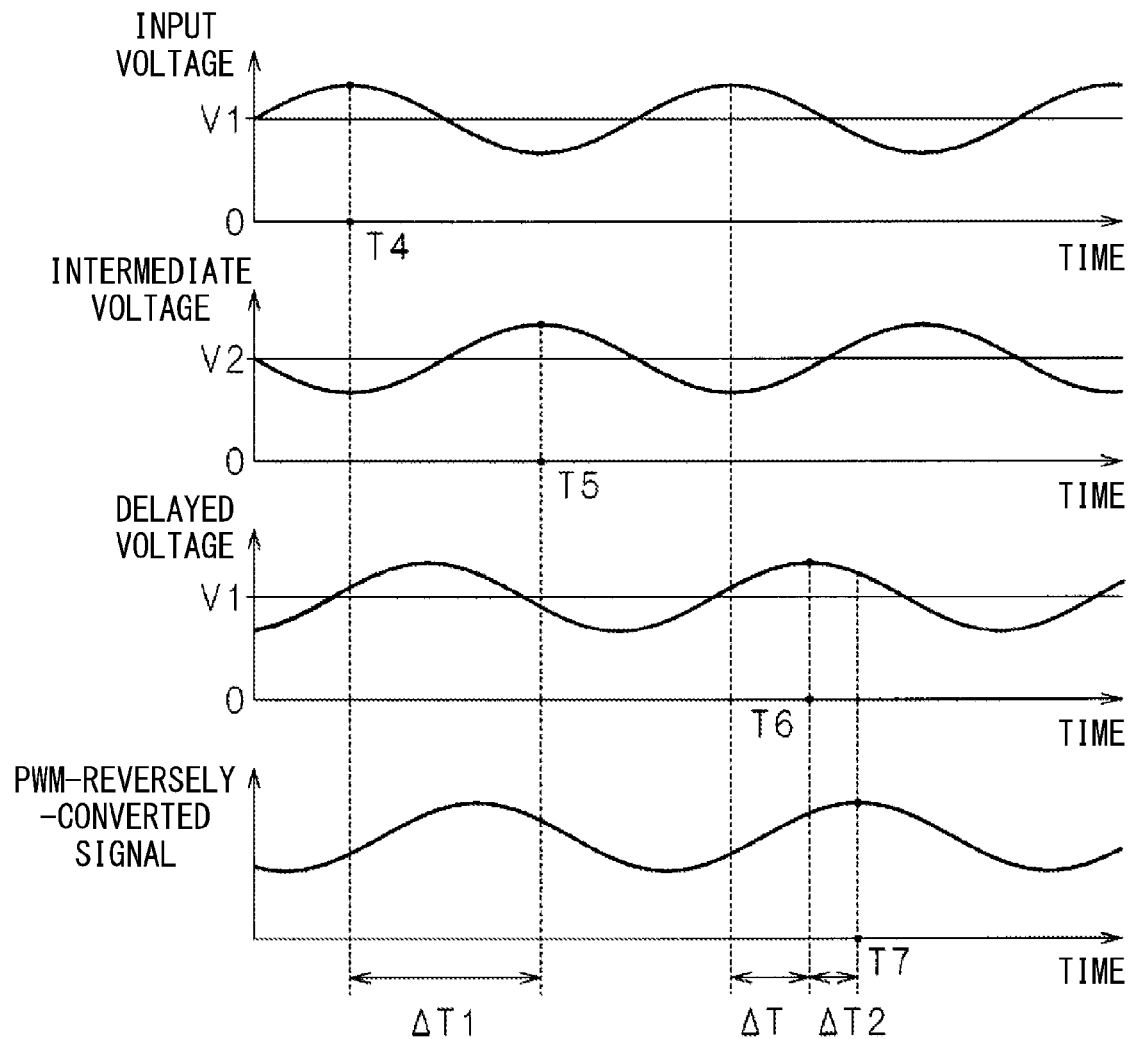
FIG. 9 is a timing chart for explaining timings for each voltage and each signal according to embodiment 3.

FIG. 9 is a timing chart explaining the timing for each voltage and each signal according to embodiment 3. In FIG. 9, an external voltage, an intermediate voltage, a delayed voltage, and a PWM reversely-converted signal are arranged from top to bottom on synchronized time axes. An external voltage given from a commercial-power source or the like may sometimes include a ripple voltage, which is a periodic voltage variation ranging for example from several tens through several hundreds of millivolts. The example illustrated in FIG. 9 illustrates a case where a ripple voltage is included in an external voltage having a reference external voltage V1. The ripple voltage included in the external voltage is delayed by the delay time ΔT1 of the non-stabilized power supply unit 51 so as to appear in the intermediate voltage.

The computation unit 52c detects the peak points of the respective ripple voltages included in the external voltage and the intermediate voltage. Thereafter, the delay time ΔT1 is measured by measuring the time that elapses between time point T4, when the peak point in the ripple voltage included in the external voltage is detected, and time point T5, when the ripple voltage included in the intermediate voltage reaches the peak. Also, the ripple voltage included in the external voltage is delayed by the delay setting time ΔT set in the delay units 52d, 52e, and 52f so as to appear in the delayed voltage. Thereafter, the ripple voltage included in the delayed voltage is delayed by the feedback delay time ΔT2 so as to appear in the PWM-reversely-converted signal.

The computation unit 52c detects the peak points of the respective ripple voltages included in the delayed voltage and the PWM-reversely-converted signal. Thereafter, the computation unit 52c measures the time that elapses between time point T6, when the peak point of the ripple voltage included in the delayed voltage is detected, and time point T7, when the peak point of the ripple voltage included in the PWM-reversely-converted signal is detected, and thereby measures the feedback delay time ΔT2.

Figure 10:
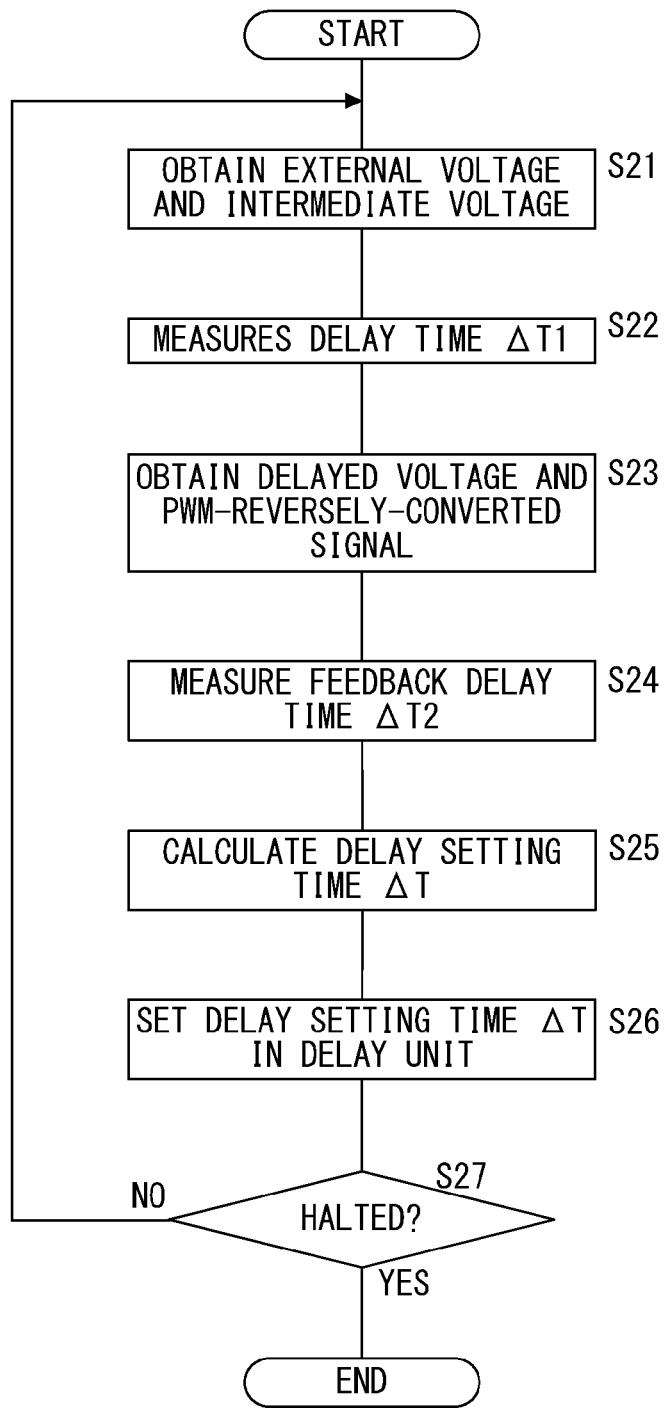
FIG. 10 is a flowchart illustrating steps of a setting process according to embodiment 3.

FIG. 10 is a flowchart illustrating steps of a setting process according to embodiment 3. The setting process is started by the computation unit 52c when the power supply device 5 is activated. The computation unit 52c obtains an external voltage and an intermediate voltage on the basis of voltage data input from the A/D conversion unit 52a (step S21). The computation unit 52c measures the delay time ΔT1 of the non-stabilized power supply unit 51 on the basis of the ripple voltages included in the external voltage and the intermediate voltage (step S22).

The computation unit 52c obtains the delayed voltage and the PWM-reversely-converted signal on the basis of voltage data output from the A/D conversion unit 52a and the computation unit 52c (step S23). The computation unit 52c measures the feedback delay time ΔT2 of each of the POL power supply units 53a, 53b, and 53c on the basis of the ripple voltage included in the delayed voltage and the PWM-reversely-converted signal (step S24). The computation unit 52c calculates the difference between the delay time ΔT1 and the delay time ΔT2 of each of the POL power supply units 53a, 53b, and 53c, and thereby calculates the delay setting time ΔT with respect to each of the delay units 52d, 52e, and 52f (step S25). The computation unit 52c sets the delay setting time ΔT in each of the delay units 52d, 53e, and 52f (step S26). The computation unit 52c determines whether or not the device has halted in response to operations of a halt switch provided in the power supply device 5 (step S27). When the computation unit 52c determines that the device has not halted (NO in step S27), the process returns to step S21. When the computation unit 52c determines that the device has halted (YES in step S27), the setting process is terminated.

Feedback control is performed while avoiding shifts of timing with respect to the variation in the external voltage in order to modify the delay setting time ΔT set in each of the delay units 52d, 52e, and 52f on the basis of the delay time ΔT1 and the feedback delay time ΔT2 that were measured on an as-needed basis. Thereby, even when the delay time ΔT1 and the feedback delay time ΔT2 vary due to a surrounding temperature or the like, the corresponding variation caused in the power supply voltage to be output can be suppressed without providing a temperature detection unit. By measuring beforehand the temperature dependency of the delay time ΔT1 and the feedback delay time ΔT2, it is also possible to omit the labor of obtaining an approximate equation and storing it.

Embodiment 3 is as has been described above, and other aspects of this embodiment are similar to those in embodiment 1 or 2. Accordingly, corresponding portions are denoted by the same symbols, and detailed explanations thereof will be omitted.

Embodiment 4

Figure 11:
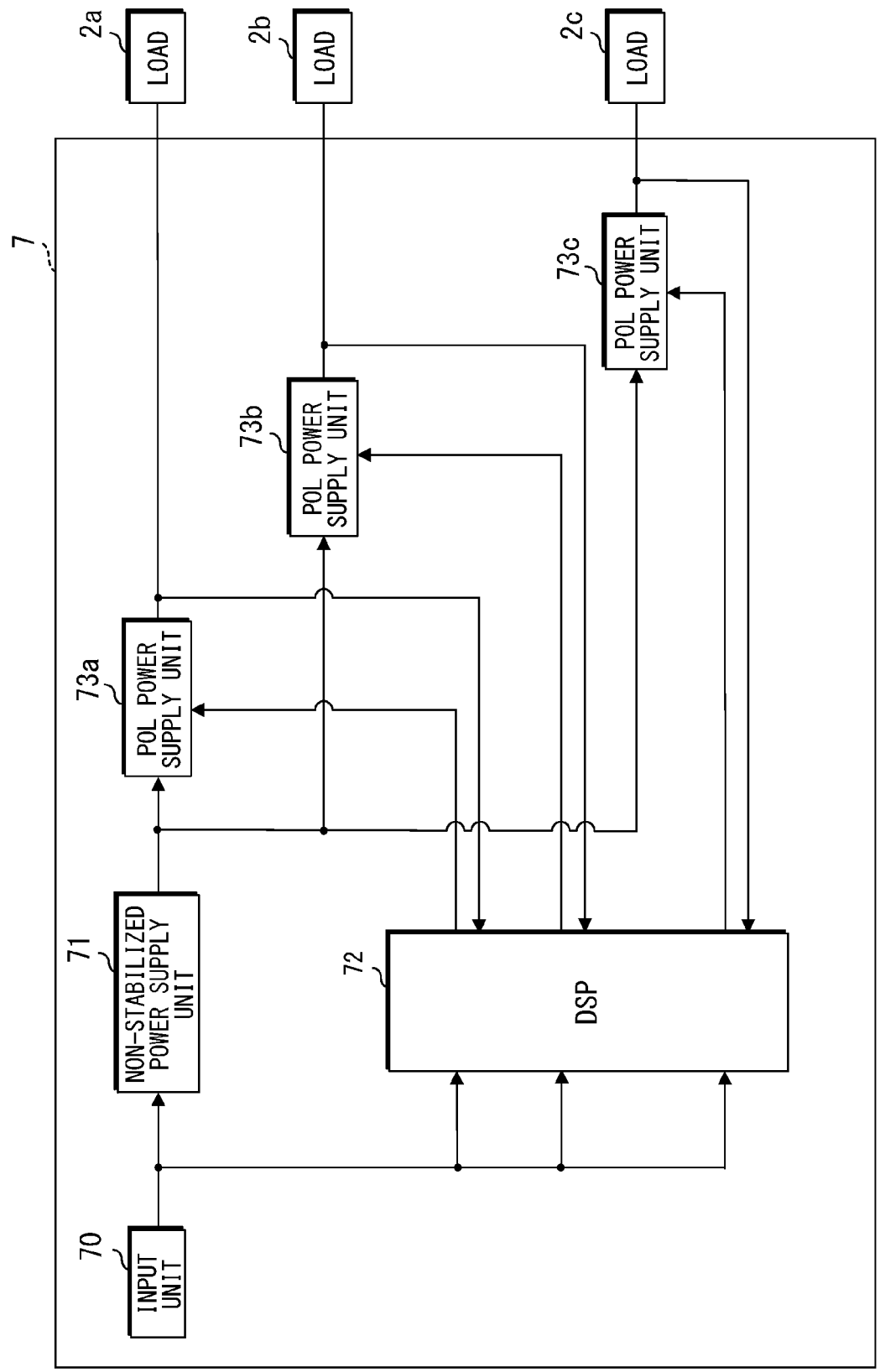
FIG. 11 is a block diagram illustrating a power supply device according to embodiment 4 and depicting loads as the output destinations of power supply voltages.

FIG. 11 is a block diagram illustrating a power supply device 7 according to embodiment 4 and depicting the loads 2a, 2b, and 2c as the output destinations of power supply voltages. The present embodiment, i.e., embodiment 4, includes the delay units 12a, 12b, and 12c and the PWM control unit 131 in a single DSP (Digital Signal Processor) while embodiment 1 has them as different hardware units. The power supply device 7 includes a DSP 72 and POL power supply units 73a, 73b, and 73c to supply different voltages to the loads 2a, 2b, and 2c, respectively. Other hardware units are similar to those in embodiment 1, and accordingly only differences in symbols are explained, omitting detailed explanations thereof. The power supply device 7 includes an input unit 70 and a non-stabilized power supply unit 71.

Figure 12:
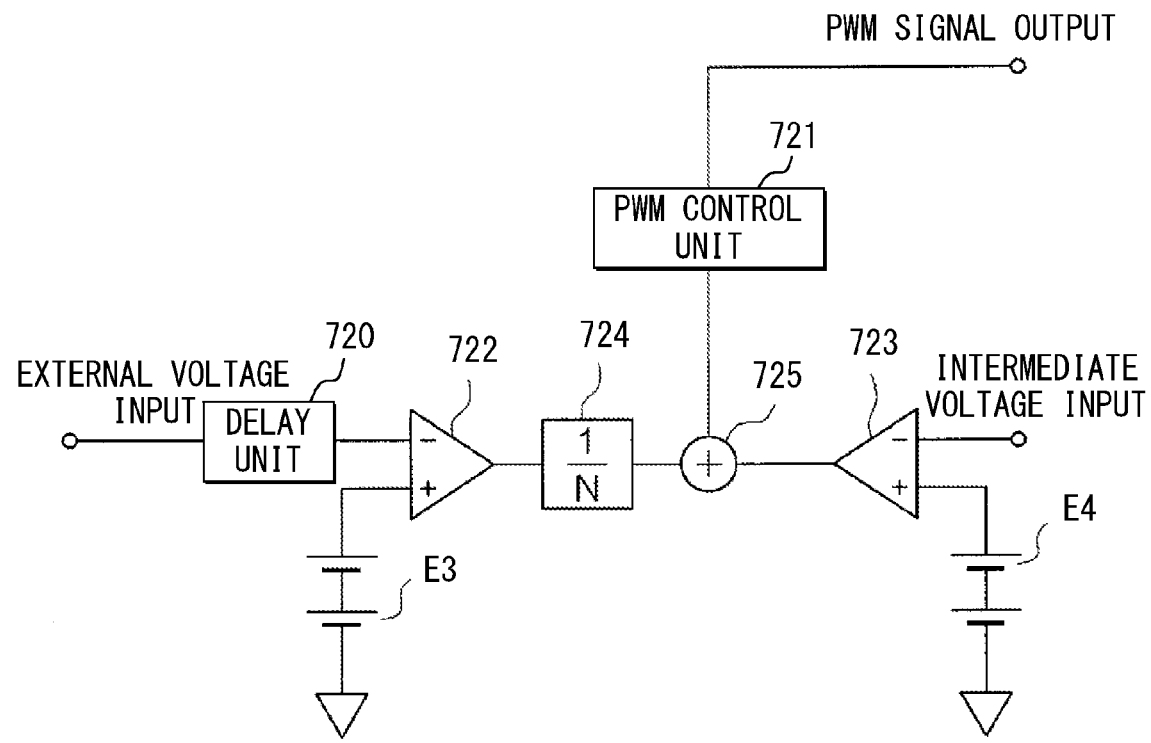
FIG. 12 is a circuit diagram illustrating an example of an internal circuit of a DSP.

FIG. 12 is a circuit diagram illustrating an example of an internal circuit of the DSP 72. The DSP 72 includes three signal processing circuits illustrated in FIG. 12, and each of the signal processing circuits outputs a PWM signal to POL power supply units 73a, 73b, and 73c. Each circuit includes a delay unit 720 to delay an external voltage input to the external-voltage input, a PWM-signal output to output PWM signals to the POL power supply units 73a, 73b, and 73c, and an intermediate-voltage input to which an intermediate voltage is input from the output terminal of a non-stabilized power supply unit 71. Other hardware units in the DSP 72 are similar to those in embodiment 1, and accordingly only differences in symbols are explained, omitting detailed explanations thereof.

The DSP 72 includes a PWM control unit 721, comparators 722 and 723, reference voltage supplies E3 and E4 to respectively output a reference power supply voltage and a reference intermediate voltage, a divider 724, and an adder 725. The output terminal of the delay unit 720 is connected to one of the inputs of the comparator 722. The DSP 72 uses the delay unit 720 to delay an external voltage given to the external-voltage input. The DSP 72 uses the divider 724 to divide a difference voltage corresponding to a difference between the delayed voltage and the reference external voltage output by the comparator 722.

Then, the DSP 72 uses the adder 725 to add the voltage obtained by the division and the difference voltage corresponding to a difference between the intermediate voltage and the reference intermediate voltage output from the comparator 133, and gives the resultant voltage as an error signal to the PWM control unit 721. The PWM control unit 721 outputs a PWM signal from the PWM-signal output to a switching element (described later) embedded in the POL power supply units 73a, 73b, and 73c so that the given error signal becomes zero.

Figure 13:
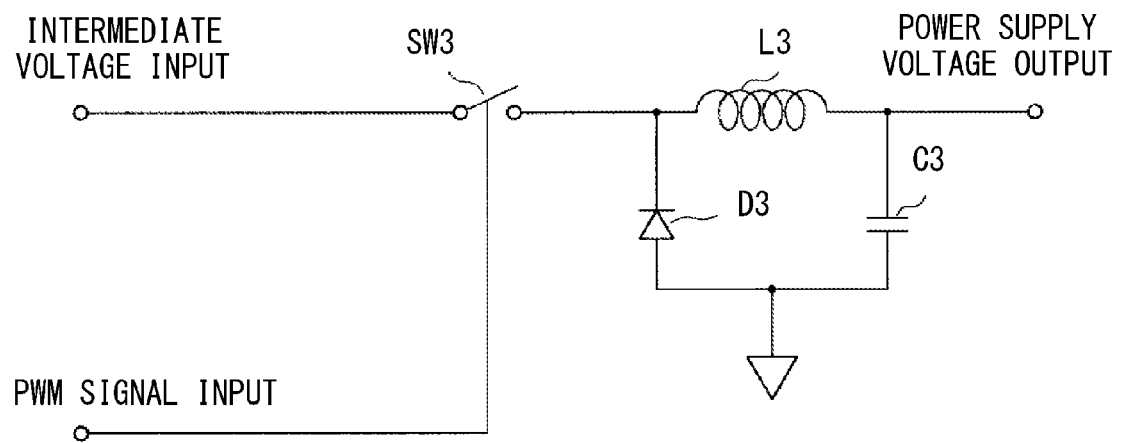
FIG. 13 is a circuit diagram illustrating an example of an internal circuit of a POL power supply unit.

FIG. 13 is a circuit diagram illustrating an example of an internal circuit of the POL power supply units 73a, 73b, and 73c. Each of the POL power supply units 73a, 73b, and 73c includes almost the same power supply circuit as that illustrated in FIG. 13. Each power supply circuit includes a PWM-signal input to which a PWM signal is input from the DSP 72, and a switching element SW3 to perform switching on an external voltage on the basis of the input PWM signal. Other hardware units in this power supply circuit are similar to those included in the circuit illustrated in FIG. 3, and accordingly only differences in symbols are explained, omitting detailed explanations thereof. The power supply circuit includes a first input to which an external voltage is input, an inductor L3, a diode D3, a capacitor C3, and a power-supply-voltage output to output a power supply voltage.

In the present embodiment, the delay unit 720, the PWM control unit 721, the comparators 722 and 723, the reference external voltage supply E3, the reference external voltage supply E4, and the divider 724 are embedded in the single DSP 72. By embedding them in the single DSP 72, wires between hardware units needed to perform feedback control can be shorter. Thereby, delays in signal transmission between hardware units are minimized, and delays in feedback control are reduced with respect to variations in an external voltage, with the result that the stability of the feedback control can be improved.

Embodiment 4 is as has been described above, and other aspects of this embodiment are similar to those in embodiments 1 through 3. Accordingly, corresponding portions are denoted by the same symbols, and detailed explanations thereof will be omitted.

Embodiment 5

Figure 14:
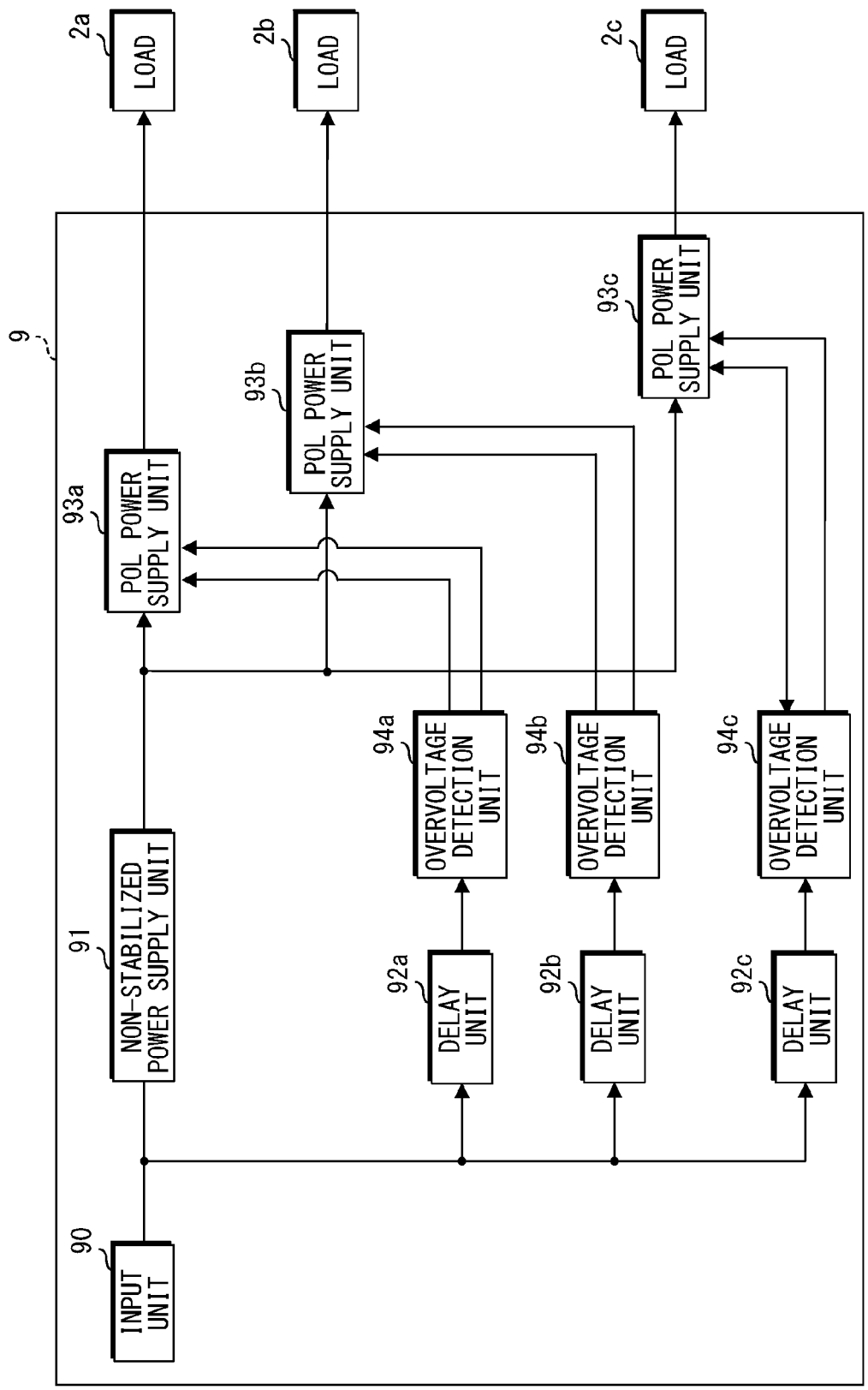
FIG. 14 is a block diagram illustrating a power supply device according to embodiment 5 and depicting loads as output destinations of power supply voltages.

FIG. 14 is a block diagram illustrating a power supply device 9 according to embodiment 5 and depicting loads 2a, 2b, and 2c as output destinations of power supply voltages. In embodiment 5, outputting of a power supply voltage is halted when a large variation occurs in an external voltage. The power supply device 9 includes overvoltage detection units (determination units) 94a, 94b, and 94c. Other hardware units are similar to those in embodiment 1, and accordingly only differences in symbols are explained, omitting detailed explanations thereof. The power supply device 9 includes an input unit 90, a non-stabilized power supply unit 91, delay units 92a, 92b, and 92c, and POL power supply units 93a, 93b, and 93c.

The input terminals of the overvoltage detection units 94a, 94b, and 94c are connected to delayed-voltage outputs of the delay units 92a, 92b, and 92c, respectively. The halting-signal outputs and the delayed-voltage outputs of the overvoltage detection units 94a, 94b, and 94c are connected to the halting-signal inputs and the delayed voltage inputs of the POL power supply units 93a, 93b, and 93c, respectively. A prescribed threshold value is set in each of the overvoltage detection units 94a, 94b, and 94c in advance. Prescribed threshold values may be set in advance on the basis of the rated values of the power supply voltages of the loads 2a, 2b, and 2c, step-down ratio N of the non-stabilized power supply unit 91, and the ratio of the rated value with respect to the intermediate voltage.

The overvoltage detection units 94a, 94b, and 94c output delayed voltages to the POL power supply units 93a, 93b, and 93c, respectively, when delayed voltages to be input are lower than the threshold value. Also, the overvoltage detection units 94a, 94b, and 94c output halting signals to the POL power supply units 93a, 93b, and 93c, respectively, and also halt the outputting of delayed voltages when a delayed voltage higher than the threshold value is input. The POL power supply units 93a, 93b, and 93c, which have received a halting signal, each halt PWM control. Thereby, it is possible to prevent the loads 2a, 2b, and 2c from malfunctioning or from being damaged by an excessively high power supply voltage that would be output from the POL power supply unit 93a, 93b, or 93c.

It is also possible to dispose overvoltage detection units 94a, 94b, and 94c at stages between the external voltage output of the input unit 90 and the external voltage inputs of the delay units 92a, 92b, and 92c, respectively. In such a case, PWM control can be halted before an excessively high intermediate voltage is input to the POL power supply units 93a, 93b, or 93c, thereby preventing the POL power supply units 93a, 93b, and 93c from malfunctioning or being damaged.

The power supply device 9 may be provided with a reset signal input unit to receive a reset signal that cancels a halted status when the power supply device 9 halts PWM control. Also, it is possible to give a cancelling signal from the overvoltage detection units 94a, 94b, and 94c to the POL power supply units 93a, 93b, and 93c, respectively, so as to restart the PWM control when a reset signal is input to the reset signal input unit. Also, the overvoltage detection units 94a, 94b, and 94c restart outputting delayed voltages. Reset signals may be received when a reset switch provided in the power supply device 9 is operated. The power supply device 9 may also be provided with a reset signal generation unit to generate a reset signal when the external voltages have continuously been lower than the threshold values set in the overvoltage detection units 94a, 94b, and 94c for a prescribed time period.

Embodiment 5 is as has been described, and other aspects of this embodiment are similar to those in embodiments 1 through 4. Accordingly, corresponding portions are denoted by the same symbols, and detailed explanations thereof will be omitted.

According to one aspect of the device disclosed herein, it is possible to suppress variations in a power supply voltage by including a control unit to perform feedback control on the basis of the variation amount of a delayed external voltage and the variation amount of an output voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A power supply device, comprising:
   a step-down unit configured to step down an input voltage;
   a switching unit configured to perform switching on a stepped-down voltage obtained through stepping down by the step-down unit so as to externally output an output voltage;
   an output variation detection unit configured to detect a corresponding variation of the output voltage from the switching unit;
   a delay unit configured to delay the input voltage by a determined time period determined based on a step-down delay time the step-down unit takes for the stepping down of the input voltage;
   a delay variation detection unit configured to detect a corresponding variation of a delayed voltage output from the delay unit;
   an addition unit configured to add the corresponding variation of the output voltage without delay and the corresponding variation of the delayed voltage respectively detected by the output variation detection unit and the delay variation detection unit; and
   a control unit configured to perform a feedback control on an operation of the switching unit based on an addition result of the addition unit.

2. The power supply device according to claim 1, wherein:
   the determined time period is determined by subtracting a feedback delay time caused by the feedback control performed by the control unit from the step-down delay time.

3. The power supply device according to claim 2, further comprising:
   a storage unit configured to store approximate equations using temperature as a variable of each of the step-down delay time and the feedback delay time for each of the approximate equations;
   a temperature detection unit configured to detect a temperature inside of the power supply device; and
   a calculation unit configured to calculate the step-down delay time and the feedback delay time on the basis of the temperature detected by the temperature detection unit and the approximate equations read from the storage unit.

4. The power supply device according to claim 2, further comprising:
   a storing unit configured to store a plurality of step-down delay time data and a plurality of feedback delay time data, in association with a plurality of temperature data, respectively;
   a temperature detection unit configured to detect a temperature; and
   a computation unit configured to read one of the plurality of step-down delay time data and one of the plurality of feedback delay time data which are associated with the temperature detected by the temperature detection unit and to calculate the determined time period using the one of the plurality of step-down delay time data and the one of the plurality of feedback delay time data as the step-down delay time and the feedback delay time.

5. The power supply device according to claim 2, wherein:
   the switching unit performs switching on the basis of a pulse signal,
   the control unit performs feedback control on a pulse width of the pulse signal, and
   the power supply device further comprises:
      a conversion unit configured to convert the pulse signal into an effective-value voltage representing an effective value per unit time; and
      a computation unit configured
         to detect ripple voltages included in the input voltage, the stepped-down voltage, the delayed voltage, and the effective-value voltage,
         to measure, as the step-down delay time, a time difference between ripple voltages respectively included in the input voltage and the stepped-down voltage, and
         to measure, as the feedback delay time, a time difference of ripple voltages respectively included in the delayed voltage and the effective-value voltage.

6. The power supply device according to claim 1,
   further comprising a determination unit configured to determine whether the input voltage input to the step-down unit is higher than a prescribed voltage, and
   wherein the control unit halts feedback control when the determination unit has determined that the input voltage is higher than the prescribed voltage.

7. The power supply device according to claim 1,
   further comprising a plurality of point of load power supply units each including the switching unit, the output variation detection unit, and the control unit, and wherein the plurality of point of load power supply units externally output a plurality of power supply voltages.

* * * * *